United States Patent
Hodges

(10) Patent No.: US 6,889,395 B1
(45) Date of Patent: May 10, 2005

(54) FLUSH RESERVOIR

(76) Inventor: George Anthony Hodges, 7729 Bermejo Rd., Fort Worth, TX (US) 76112

(*) Notice: Subject to any disclaimer, the term of this patent is extended or adjusted under 35 U.S.C. 154(b) by 0 days.

(21) Appl. No.: 10/860,076

(22) Filed: Jun. 4, 2004

(51) Int. Cl.[7] ............................................. F03C 1/01

(52) U.S. Cl. ........................................... 4/665; 4/441

(58) Field of Search ......................... 4/441, 661, 664, 4/665; 210/103–105, 123, 125, 128; 220/216, 220/218

(56) References Cited

U.S. PATENT DOCUMENTS

| | | | | |
|---|---|---|---|---|
| 4,197,597 A | * | 4/1980 | Toms | ............................. 4/300 |
| 4,349,436 A | * | 9/1982 | Kaump | ....................... 210/104 |
| 5,406,657 A | | 4/1995 | Donati | |
| 5,452,956 A | * | 9/1995 | Gilliam | ....................... 366/348 |
| 5,730,179 A | | 3/1998 | Taylor | |
| 6,357,183 B1 | | 3/2002 | Smith | |

* cited by examiner

Primary Examiner—Gregory L. Huson
Assistant Examiner—Huyen Le
(74) Attorney, Agent, or Firm—Matthew J. Peirce

(57) ABSTRACT

A rainwater collection system for supplying water to a toilet includes a gutter, water reservoir tank, excess water output conduit, toilet, and water bypass assembly for diverting water out through the water output conduit when the water reservoir tank is sufficiently full.

10 Claims, 3 Drawing Sheets

FLUSH RESERVOIR

I. BACKGROUND OF THE INVENTION

The present invention relates to water collection systems and more particularly pertains to a new rainwater collection system for supplying water to a toilet to minimize use of more expensive water sources.

II. DESCRIPTION OF THE PRIOR ART

The use of water collection systems is known in the prior art. U.S. Pat. No. 5,730,179 issued to Taylor on Mar. 24, 1998 describes a rainwater collection apparatus for collecting rainwater into a tank. Another type of water collection device is U.S. Pat. No. 5,406,657 issued to Donati having a relatively complex water reservoir for collecting and pumping gray water to a toilet. U.S. Pat. No. 6,357,183 issued to Smith on Mar. 19, 2002 discloses a water collection device integrally attached to a house adjacent to a roof extremity.

While these devices fulfill their respective, particular objectives and requirements, the need remains for a relatively simple gravity driven system that collects, filters, disinfects and stores rainwater for use in a toilet.

III. SUMMARY OF THE INVENTION

The present invention generally comprises a gutter, water reservoir tank, excess water output conduit, toilet, and water bypass assembly for diverting water out through the water output conduit when the water reservoir tank is sufficiently full. The bypass assembly includes a float member that acts as a bypass valve.

There has thus been outlined, rather broadly, the more important features of a rainwater collection system for supplying water to a toilet in order that the detailed description thereof that follows may be better understood, and in order that the present contribution to the art may be better appreciated. There are additional features of the rainwater collection system for supplying water to a toilet that will be described hereinafter and which will form the subject matter of the claims appended hereto.

In this respect, before explaining at least one embodiment of the rainwater collection system for supplying water to a toilet in detail, it is to be understood that the rainwater collection system for supplying water to a toilet is not limited in its application to the details of construction and to the arrangements of the components set forth in the following description or illustrated in the drawings. The rainwater collection system for supplying water to a toilet is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present rainwater collection system for supplying water to a toilet. It is important, therefore, that the claims be regarded as including such equivalent constructions insofar as they do not depart from the spirit and scope of the present invention.

It is therefore an object of the present invention to provide a rainwater collection system for supplying water to a toilet which has all of the advantages of the prior art and none of the disadvantages.

It is another object of the present invention to provide a rainwater collection system for supplying water to a toilet which may be easily and efficiently manufactured and marketed.

It is another object of the present invention to provide a rainwater collection system for supplying water to a toilet which is of durable and reliable construction.

It is yet another object of the present invention to provide a rainwater collection system for supplying water to a toilet which is economically affordable and available for relevant market segment of the purchasing public.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Figure 1:
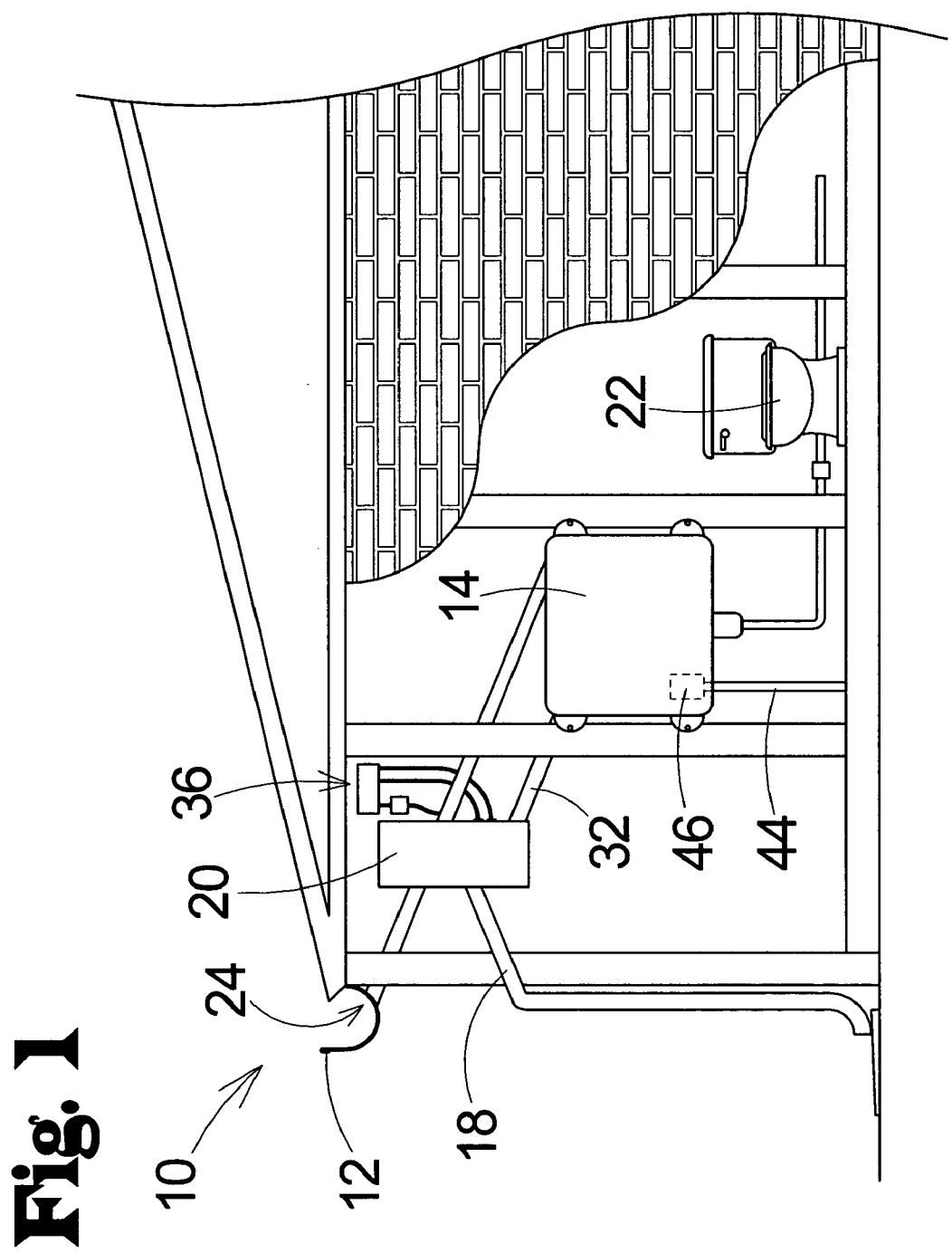
FIG. 1 is a front view of a new rainwater collection system for supplying water to a toilet according to the present invention.
Figure 2:
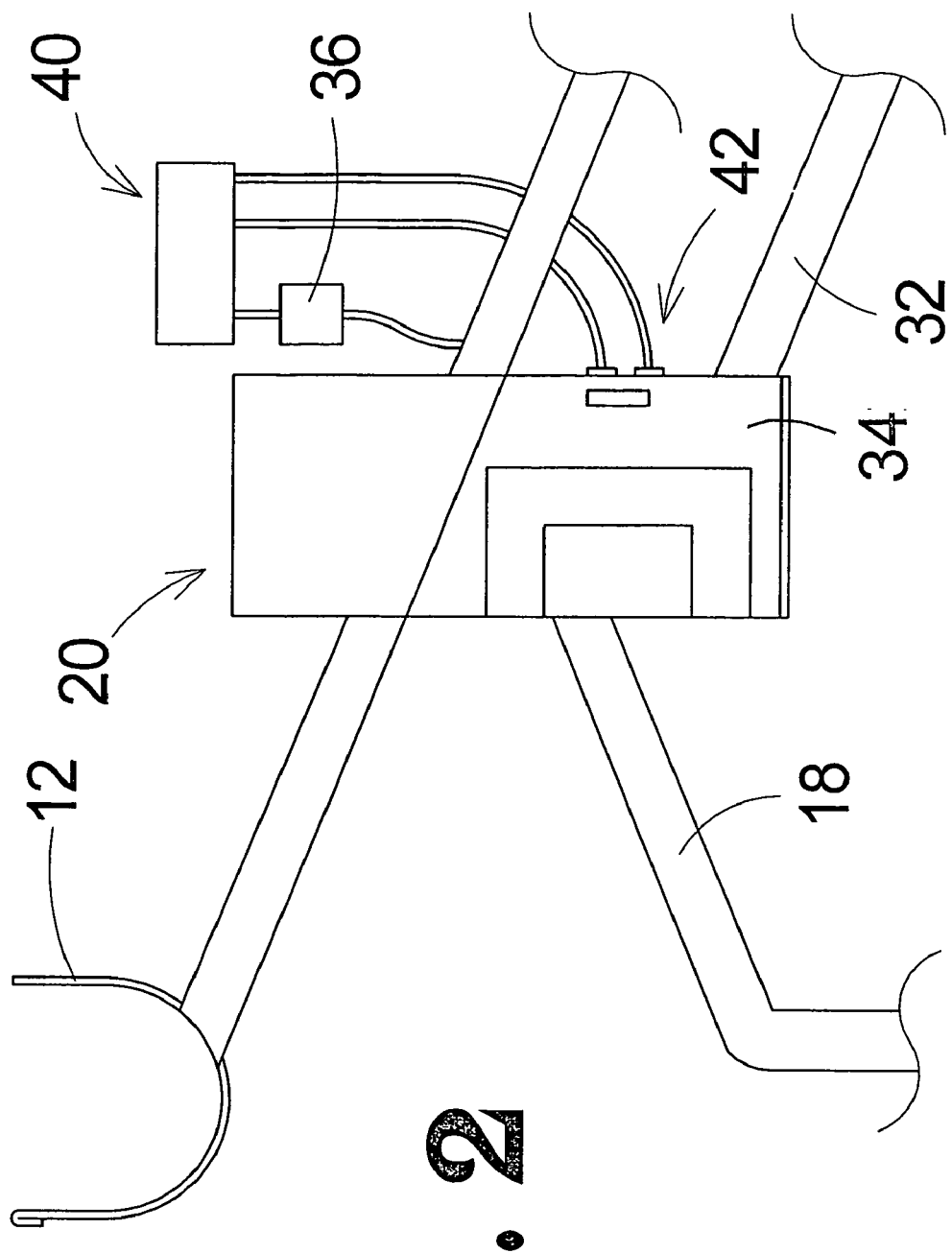
FIG. 2 is a cross-sectional view of the bypass assembly of the present invention for collecting water.
Figure 3:
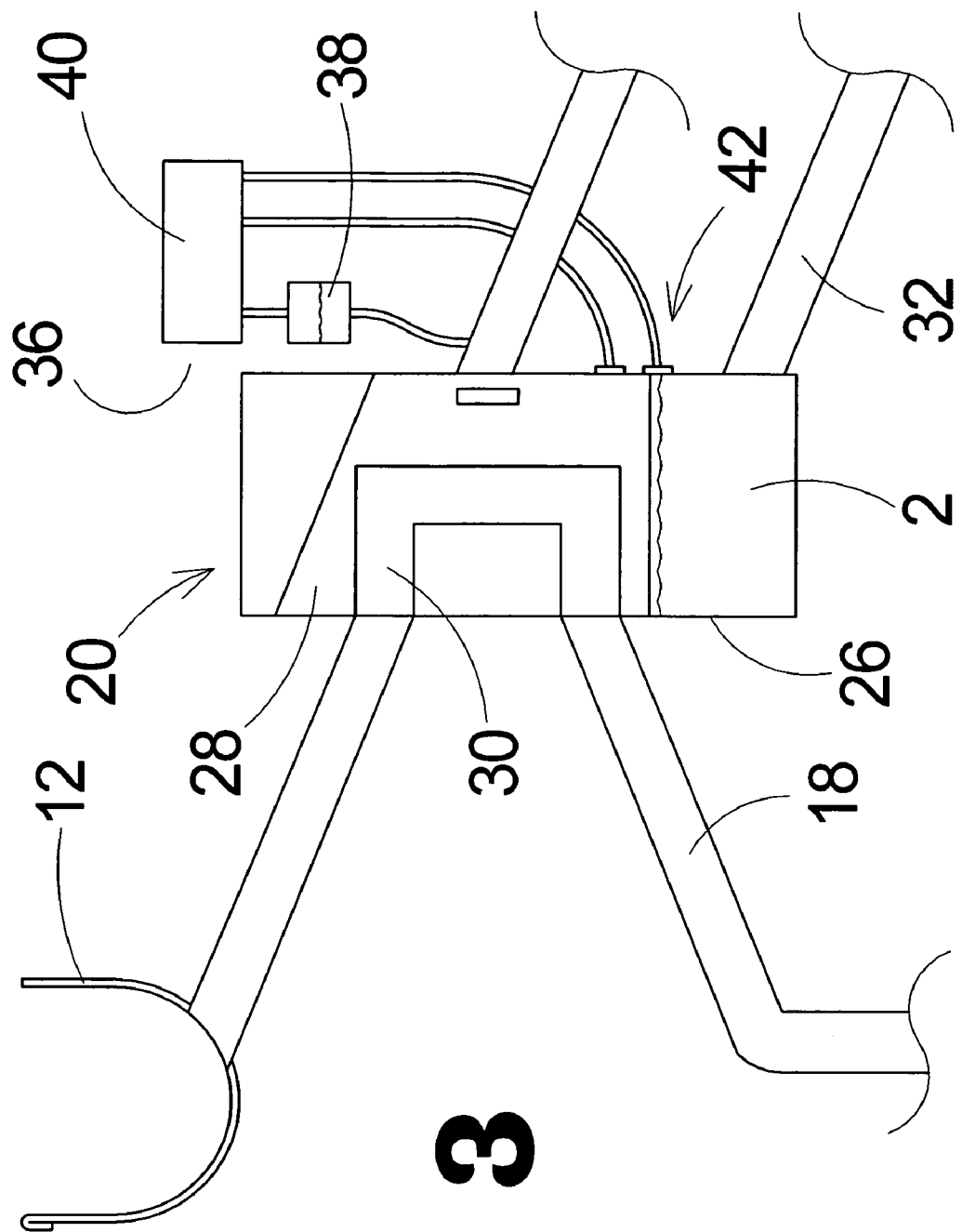
FIG. 3 is a cross-sectional view of the bypass assembly of the present invention for diverting water from the water reservoir tank.

With reference now to the drawings, and in particular to FIGS. 1 through 3 thereof, a new rainwater collection system for supplying water to a toilet embodying the principles and concepts of the present invention and generally designated by the reference numeral 10 will be described.

As best illustrated in FIGS. 1 through 3, the rainwater collection system for supplying water to a toilet 10 generally comprises a gutter 12 for collecting water 2. A water reservoir tank 14, preferably holding a minimum of 50 gallons, is environmentally coupled to the gutter 12 for holding water collected by the gutter 12. A water bypass assembly 20 is environmentally coupled between the gutter 12 and the water reservoir tank 14 for diverting water collected by the gutter 12 from entering the water reservoir tank 14 when the water reservoir tank 14 contains a predetermined maximum level. A water output conduit 18 is coupled to the water bypass assembly 20 for receiving water diverted away from the water reservoir tank 14 by the water bypass assembly 20. A toilet 22 is operationally coupled to the water reservoir tank 14 such that water collected in the water reservoir tank 14 is utilized by the toilet 22.

In an embodiment, a filter assembly 24 is coupled between the gutter 12 and the water bypass assembly 14 to prevent debris from entering the water reservoir tank 14. The filter assembly may include one or more screens and/or replaceable filters.

The water bypass assembly 20 includes a main chamber 26 holding a float member 28 positioned within the main chamber 26. The float member 28 moves between an elevated position and a lowered position. A diversion conduit 30 extends through the float member 28 for environmentally coupling the gutter 12 to the water output conduit 18 when the float member 28 is in the elevated position. The bottom of the main chamber 26 is positioned at a higher elevation than the top of the water reservoir tank and the two are connected by a reservoir backflow conduit 32 extending from the water reservoir tank 14 to a lower portion 34 of the main chamber 28. Thus, water collected in the water reservoir tank 14 urges the float member 28 into the elevated position when water collected in the water reservoir tank 14 reaches the pre-determined maximum level.

Preferably, a chemical cleansing assembly 36 is operationally coupled to the water reservoir tank 14 for introducing a chemical agent 38 such as bleach into water collected in the water reservoir tank 14. A cleanser activation switch assembly 40 is coupled to the water bypass assembly 20. The cleanser activation switch assembly 40 includes a proximity sensor 42 for permitting release of the chemical agent 38 when the float member is detected to be in the particular position by the proximity sensor 42. The operational connection can then be made such that the rate of release of the chemical agent 38 is adjusted according to the position of the float member 28.

A secondary water source 44 is used for providing water to the water reservoir tank 14 when the water reservoir tank 14 holds less than a pre-determined threshold amount of water. A shutoff valve 46 is operationally coupled to the secondary water source 44 for selectively preventing water from passing into the water reservoir tank 14 from the secondary water source 44 when the water reservoir tank 14 holds an amount of water greater than the pre-determined threshold amount of water. Typically, a float valve may be employed to open and close the shutoff valve 46 as described. Alternately, the secondary source of water may be provided directly to the toilet and a valve used to bring water into the toilet from the secondary source of water until the water level inside the water reservoir tank is restored to a minimum operational level, typically, 5 gallons.

The system is primarily driven by gravity and flotation valves but a solar collection panel may be incorporated into the invention to provide efficient electronic control mechanisms as desired.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. A rainwater collection system for supplying water to a toilet, said rainwater collection system comprising:
   (a) a gutter for collecting water,
   (b) a water reservoir tank environmentally coupled to said gutter for holding water collected by said gutter,
   (c) a water bypass assembly environmentally coupled between said gutter and said water reservoir tank for diverting water collected by said gutter from entering said water reservoir tank when said water reservoir tank contains a pre-determined maximum level,
   (d) a water output conduit coupled to said water bypass assembly for receiving water diverted from said water reservoir tank by said water bypass assembly, and
   (e) a toilet operationally coupled to said water reservoir tank such that water collected in said water reservoir tank is utilized by said toilet.

2. The rainwater collection system of claim 1 wherein the rainwater collection system further comprises a filter assembly coupled between said gutter and said water bypass assembly.

3. The rainwater collection system of claim 1 wherein said water bypass assembly comprises
   (a) a main chamber,
   (b) a float member positioned in said main chamber, said float member having an elevated position and a lowered position, and
   (c) a diversion conduit extending through said float member, said diversion conduit environmentally coupling said gutter to said water output conduit when said float member is in said elevated position.

4. The rainwater collection system of claim 3 wherein the rainwater collection system further comprises a reservoir backflow conduit extending from said water reservoir tank to a lower portion of said main chamber whereby water collected in said water reservoir tank urges said float member into said elevated position when water collected in said water reservoir tank reaches said pre-determined maximum level.

5. The rainwater collection system of claim 3 wherein the rainwater collection system further comprises:
   (a) a chemical cleansing assembly operationally coupled to said water reservoir tank for introducing a chemical agent into water collected in said water reservoir tank, and
   (b) a cleanser activation switch assembly coupled to said water bypass assembly, said cleanser activation switch assembly including a proximity sensor for detecting a position of said float member within said main chamber for releasing said chemical agent into said water reservoir tank at a rate relative to a position of said float member within said main chamber.

6. The rainwater collection system of claim 1 wherein the rainwater collection system further comprises a chemical cleansing assembly operationally coupled to said water reservoir tank for introducing a chemical agent into water collected in said water reservoir tank.

7. The rainwater collection system of claim 1 wherein the rainwater collection system further comprises:
   (a) a secondary water source for providing water to said water reservoir tank when said water reservoir tank holds less than a pre-determined threshold amount of water, and
   (b) a shutoff valve operationally coupled to said secondary water source for selectively preventing water from passing into said water reservoir tank from said secondary water source when said water reservoir tank holds an amount of water greater than said pre-determined threshold amount of water.

8. The rainwater collection system of claim 7 wherein said pre-determined threshold amount of water is 5 gallons.

9. The rainwater collection system of claim 1 wherein said water reservoir tank has a capacity of 50 gallons.

10. The rainwater collection system of claim 1 wherein the rainwater collection system further comprises
    (a) a filter assembly coupled between said gutter and said water bypass assembly, wherein said water bypass assembly comprises (i) a main chamber, (ii) a float member positioned in said main chamber, said float member having an elevated position and a lowered position, and (iii) a diversion conduit extending through said float member, said diversion conduit environmentally coupling said gutter to said water output conduit when said float member is in said elevated position, (b) a reservoir backflow conduit extending from said water reservoir tank to a lower portion of said main chamber whereby water collected in said water reservoir tank urges said float member into said elevated position when water collected in said water reservoir tank reaches said pre-determined maximum level, (c) a chemical cleansing assembly operationally coupled to said water reservoir tank for introducing a chemical agent into water collected in said water reservoir tank, (d) a cleanser activation switch assembly coupled to said water bypass assembly, said cleanser activation switch assembly including a proximity sensor for detecting a position of said float member within said main chamber for releasing said chemical agent into said water reservoir tank at a rate relative to a position of said float member within said main chamber, (e) a secondary water source for providing water to said water reservoir tank when said water reservoir tank holds less than a pre-determined threshold amount of water, (f) a shutoff valve operationally coupled to said secondary water source for selectively preventing water from passing into said water reservoir tank from said secondary water source when said water reservoir tank holds an amount of water greater than said pre-determined threshold amount of water, (g) wherein said pre-determined threshold amount of water is 5 gallons, and (h) further wherein said water reservoir tank has a capacity of 50 gallons.

* * * * *